United States Patent [19]
Brown et al.

[11] Patent Number: 5,173,378
[45] Date of Patent: * Dec. 22, 1992

[54] PASSIVE COOLING DEVICE FOR EXTENDING BATTERY LIFE

[75] Inventors: Dale M. Brown; Philip G. Kosky; Lionel M. Levinson; Roy F. Thornton, all of Schenectady, N.Y.

[73] Assignee: General Electric Company, Schenectady, N.Y.

[*] Notice: The portion of the term of this patent subsequent to Jul. 30, 2008 has been disclaimed.

[21] Appl. No.: 699,085

[22] Filed: May 13, 1991

Related U.S. Application Data

[63] Continuation-in-part of Ser. No. 444,338, Dec. 1, 1989, Pat. No. 5,035,964.

[51] Int. Cl.$^5$ .............................................. H07M 10/50
[52] U.S. Cl. ...................................... 429/120; 165/53
[58] Field of Search .......................... 429/120; 165/53

[56] References Cited

U.S. PATENT DOCUMENTS

| | | | |
|---|---|---|---|
| 2,385,127 | 9/1945 | Carlile | 429/120 X |
| 4,076,074 | 2/1978 | Tompkins | 165/53 |
| 4,107,402 | 8/1978 | Dougherty et al. | 429/120 |
| 4,329,407 | 5/1982 | Gross et al. | 429/120 X |
| 4,333,517 | 6/1982 | Parro | 165/53 X |
| 4,629,622 | 12/1986 | Yonezu et al. | 429/120 X |
| 5,035,964 | 7/1991 | Levinson et al. | 429/120 |

*Primary Examiner*—Stephen Kalafut
*Attorney, Agent, or Firm*—Donald S. Ingraham; Marvin Snyder

[57] ABSTRACT

A battery exposed to heating from incident sunlight is cooled by rejecting heat to air drawn through a chimney by the heating of at least portions of the chimney by the incident sunlight. The battery is placed within the chimney so that the air flow in the chimney passes around the battery, enabling heat to be transferred directly from the battery to the air. Air flow in the chimney is generated by sunlight incident on the exterior of the chimney, causing heating of air within at least a portion of the chimney to create a natural convective air flow within the chimney, with relatively cool outside ambient air being drawn in at one end of the chimney and heated air being exhausted out the other end of the chimney.

16 Claims, 1 Drawing Sheet

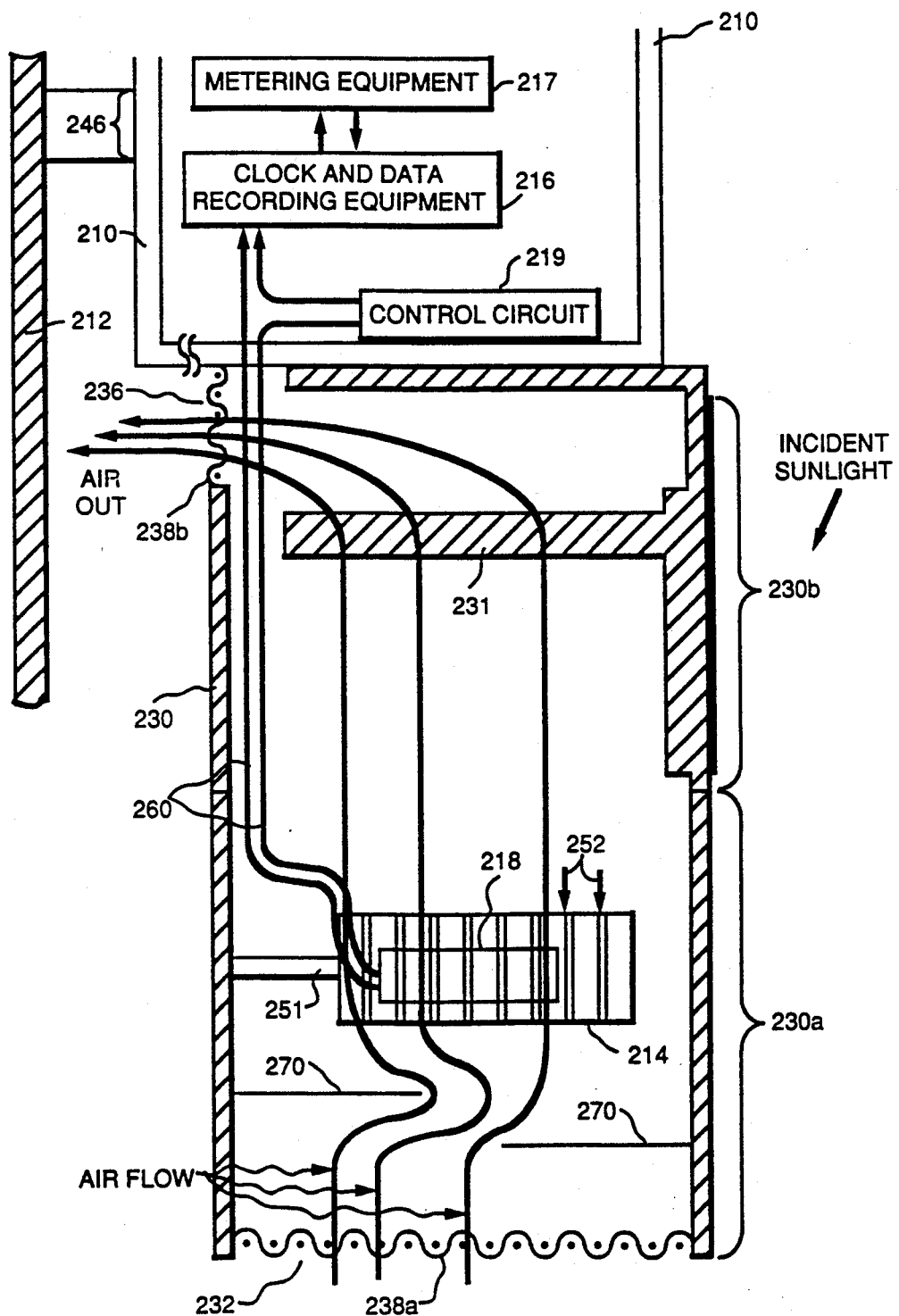

PASSIVE COOLING DEVICE FOR EXTENDING BATTERY LIFE

BACKGROUND OF THE INVENTION

This application is a continuation-in-part of an application of the same title, Ser. No. 07/444,338, filed Dec. 1, 1989, issued Jul. 30, 1991 U.S. Pat. No. 5,035,964.

The present invention relates to battery backup power systems and, more particularly, to a passive cooling device for extending the life of a battery backup power system used for powering electronic components when utility line power is interrupted or unavailable.

Use of a battery or an electrolytic-type device to provide backup power to electronic equipment during a power outage is known in the art. One such application is with time-of-use (TOU) watt-hour meters. TOU watt-hour meters permit electric utilities to apply complex rate structures to their customers. TOU watt-hour meters typically sample a customer's energy usage at selected times and record the kilowatts used with the corresponding time of use; thus, different billing rates can be applied for different times of the day, days of the week and even during certain times of the year, such as holidays and different seasons. These meters typically utilize an application specific integrated circuit (ASIC) microprocessor or the like for recording the kilowatts consumed and the time of use. The ASIC will also include a clock for measuring time and maintaining calendar information. The ASIC and clock are powered by the utility line power under normal operating conditions; these meters also usually have a battery for backup ASIC power when utility line power is interrupted. The battery will maintain operation of the ASIC clock during power outages to prevent the need for a maintenance visit after power is restored by utility personnel to reset the system clock to correct for the period of power outage.

A lithium-type battery may be used in TOU watt-hour meters to maintain the ASIC clock during power outages, but these type batteries have a limited shelf life and typically must be replaced about every five years at a cost of about $10 per battery. Maintaining reliable battery backup for TOU watt-hour meters constitutes a considerable burden for utility companies in light of the number of units in the field and the associated logistic and record-keeping requirements. To meet the needs of most utility companies which use TOU watt-hour meters, a desired backup battery power system will have a shelf life in excess of about 10 years, and provide approximately 2-5 volts and 1-10 $\mu$ amps for more than about 30 days. Solid state lithium iodine-type batteries, such as those used in heart pacemakers and the like, typically have a life in excess of about 20 years when operated at body temperature, about 37° C. However, the life of these pacemaker-type batteries decreases and the current and voltage levels produced by these batteries become unreliable when the batteries are stored at higher temperatures. TOU watt-hour meters can be exposed to temperatures as high as about 85° C. for long periods in some climates; under such conditions, the capacity of the battery can decrease by about 80 percent in five years.

Similarly, other types of batteries also experience a decrease in capacity when exposed to high temperatures and therefore it is desirable to maintain battery temperature below a level selected to provide a long storage life for the battery.

Active cooling of a TOU watt-hour meter battery using a thermoelectric (TE) cooling module and associated electronics was disclosed and claimed in co-pending applications Ser. No. 07/387,183, filed Jul. 31, 1989, now U.S. Pat. No. 4,999,576 and Ser. No. 07/611,566, filed Nov. 13, 1990, both of which are assigned to the assignee of the present invention and incorporated herein by reference for background information. The TE cooling device and controlling electronics disclosed in these co-pending applications are highly efficient but have a moderate cost. In one arrangement, as disclosed in U.S. Pat. No. 4,999,576 the utility power line is tapped to provide power to the TE working module when the cooling control circuitry senses a battery temperature in excess of a selected level. Since the TE working module is operated by DC voltage, the AC utility power must be transformed, converted to DC and conditioned to remove harmonics for efficient operation of the TE module. In another arrangement, as described in application Ser. No. 07/611,566, solar cells exposed to the incident sunlight produce the electric energy to power the TE module. Cooling systems using the TE module are very effective for cooling the battery but are more complex and costly than systems that do not require a power supply and associated control circuits.

It is accordingly an object of the present invention to provide a backup power supply device for a TOU watt-hour meter than is not subject to the foregoing disadvantages.

It is a further object of the present invention to provide a passive cooling device, the cooling effect of which is responsive to the intensity of incident sunlight, for cooling a temperature sensitive component subject to heating by the sunlight.

It is another object of the present invention to provide a passive cooling device for cooling the backup battery for a TOU watt-hour meter to extend the useful life of the backup battery.

These and other objects of the invention, together with the features and advantages thereof, will become apparent from the following detailed specification when read with the accompanying drawing in which like reference numerals refer to like elements.

SUMMARY OF THE INVENTION

In accordance with the present invention, an electrical-energy-supplying device having an extended storage life, which may be used as a battery backup power supply for a TOU watt-hour meter when utility power is interrupted, comprises a battery for supplying electrical energy and chimney means for generating an air flow to dissipate heat from the battery, with the rate of air flow in the chimney being responsive to the intensity of sunlight incident on the chimney.

In the preferred embodiment of the invention, the battery is placed within the chimney and the air flow generated by the chimney passes directly over the battery housing, removing heat from the battery. The chimney means is exposed at least in part to the incident sunlight which heats the battery. The heating of air within the chimney results in a natural convective flow in which the heated air rises through the chimney and exits the upper end of the chimney. Cooler outside air is drawn into the bottom of the chimney, thereby allowing heat from the battery to be rejected to the cooler air flowing up the chimney. The chimney body preferably has a lower segment, the exterior of which is light reflective, and an upper segment, the exterior of which is light absorptive. The lower segment may also advantageously comprise a low thermal conductivity material to minimize heating of the air contained within the lower segment, and an upper segment that comprises a high thermal conductivity material to enhance heating of air enclosed by the upper segment. Air in the chimney upper segment is warmed when light or other heat energy is incident on the heat-absorbent upper segment; the warmed air will rise in the chimney through natural convective flow and exit the chimney through the opening in the upper segment. The rising air causes cooler air to be drawn into the bottom opening and then up through the chimney to create a draft. Air will thus continuously circulate through the chimney as long as sufficient light or heat energy is incident upon the heat absorbent upper segment to sustain a draft which will draw fresh air into the open bottom of the chimney. The chimney is preferably mounted adjacent to the meter housing in a position providing maximum exposure to incident sunlight at times of the day when battery heating from the sunlight is the greatest.

BRIEF DESCRIPTION OF THE DRAWINGS

The single FIGURE is a side elevation view of the electrical-energy-supplying device in accordance with the preferred embodiment of the present invention wherein the battery is positioned within the chimney.

DETAILED DESCRIPTION OF THE PREFERRED EMBODIMENT

In accordance with the preferred embodiment of the present invention as illustrated in the FIGURE, a TOU watt-hour meter housing 210 is shown mounted on an exterior wall 212 of a structure to which the utility company is supplying electrical power. Mounting bars 246 position meter housing 210 away from the side of wall 212 to allow air flow therebetween. A battery means 218, such as a lithium-type battery, "pacemaker-type" battery or the like, is coupled via connecting wires 260 to a control circuit 219 and to clock and data recording equipment 216. Clock and data recording equipment 216 are coupled to metering equipment 217, which measures electrical power drawn from the utility line (not shown). Battery 218 provides backup power to the clock and data recording equipment in the event of a loss of power on the utility line.

A thermally conductive battery housing 214, with battery 218 enclosed therein, is disposed in a spaced relationship to a chimney body 230 to allow air rising through the chimney to pass around battery housing 214 and to thus remove heat from the battery. Although the battery may be placed in any position inside or outside of the chimney where the natural convective air flow generated by the chimney can be directed across the battery in sufficient amounts to cool the battery, battery housing 214 is preferably placed within chimney body 230 near the bottom of the chimney so that the coolest air, i.e. the air entering the chimney, is drawn across the battery housing. Battery housing 214 advantageously has additional means to transfer heat from the battery to the air flowing around it; as illustrated in the FIGURE, housing 214 has fins 252 extending outwardly from the exterior surface of the housing into the air flow path around the housing to increase the surface area exposed to the chimney's natural convective air-flow, thereby enhancing heat transfer from the battery to the air rising through the chimney.

Chimney body 230 is disposed adjacent to or beneath meter housing 210. Chimney body 230 is of a size and shape to provide for natural convective air flow (i.e., the chimney effect) of sufficient volume to cool the battery. Chimney body 230 advantageously comprises a lower segment 230a and an upper segment 230b. The upper and lower segments may comprise the same material or two separate materials, as described below. Lower segment 230a has a light and heat reflective outer surface, e.g. a shiny or polished light-colored surface, to minimize heating of air within the lower segment. Upper segment 230b has an outer surface that is heat and light absorptive, e.g. a dark, dull finish, such as may be obtained with flat black paint applied to at least a portion of the surface, to maximize heat absorption and transfer to air within the upper segment.

The difference in rates of heat transfer to the air from the upper segment and the lower segment is enhanced when lower segment 230a and upper segment 230b comprise materials having different thermal conductivities. For example, lower segment 230a preferably comprises a material, such as monel, having a relatively low thermal conductivity, e.g. 19 BTUhr$^{-1}$°F.$^{-1}$ or less at room temperatures. A material having a low thermal conductivity minimizes heating of air in the volume surrounded by lower segment 230a. Upper segment 230b advantageously comprises a material, such as copper, having a relatively high thermal conductivity, e.g. 232 BTUhr$^{-1}$°F.$^{-1}$ or greater at room temperature. Thus, heat absorbed by the portion of upper segment 230b exposed to incident sunlight is readily transferred to the entire structure of upper segment 230b, which in turn increases the area for heat transfer from the upper segment to the air within the chimney. Heat transfer from upper segment 230b to air within that portion of the chimney is also enhanced by one or more heat exchange fins 231. Fins 231 are thermally coupled, i.e. connected to allow the transmission of heat energy across the connection, to upper segment 230b at one or more places and are disposed in the interior of chimney body 230 through which the natural convective air flow passes. As illustrated in the FIGURE, fins protrude from the inner wall of upper segment 230b towards the center of the chimney. Other arrangements (not shown) can alternatively be used, for example the fins can be connected at both ends to upper segment 230b and form a spoke arrangement or a matrix type arrangement, and can protrude from different levels along the longitudinal axis of the upper segment. Regardless of the particular arrangement, fins 231 conduct heat energy from upper segment 230b and that heat energy is convectively transferred to air passing around the fins.

Chimney body 230 has a lower opening 232 which is preferably located at the bottom of lower segment 230a and comprises substantially the entire cross sectional area of lower segment 230a. An upper opening 236 is located at or near the top of upper segment 230b, and is sized to allow air flow generated by the heating effects in the chimney to pass from the chimney in sufficient amounts to effect the desired cooling of the battery. For example, as shown in the FIGURE, upper opening 236 may extend around a portion of the circumference of upper segment 230b when chimney body 230 is disposed beneath meter housing 210. Openings 232 and 236 are advantageously covered by mesh screens 238a and 238b respectively, which screens allow for air flow therethrough but keep out foreign objects which may block the air flow, such as insects or animals which may otherwise build nests in the chimney. One or more light baffles 270 are positioned across bottom opening 232 to minimize incident sunlight reflected from the ground or other surfaces from entering the interior of chimney 230 in the vicinity of battery housing 214. Baffles 270 are positioned so as to not significantly impede air flow into the chimney at the flow rates that will reasonably be generated by the natural convective flow.

Thus, in accordance with this preferred embodiment of the present invention, the heat transfer characteristics of lower segment 230a serve to minimize heating of air entering bottom opening 232, thereby allowing relatively cool air to pass over battery housing 214. The heat transfer characteristics of upper segment 230b serve to maximize heat transfer to the air in the upper portion of the chimney to enhance the natural convective flow of air through the chimney.

A support member 251 is connected to chimney 230 and battery housing 214 to position the battery housing in the interior portion of the chimney where air flowing through the chimney can pass over or around almost all surfaces of the battery housing. Support member 251 preferably comprises a thermally insulative material, such as PTFE (polytetrafluoroethylene) or monel, to minimize conductive heat transfer from chimney body 230 to the battery.

Chimney body 230 is positioned with respect to meter housing 210 so that at least upper segment 230b is exposed to incident sunlight at the time of day when battery 218 is subject to the greatest heating from the sunlight. In operation, air within the chimney is warmed by heat transferred through the walls of upper segment 230b. The heated air rises in the chimney and exits through upper opening 236, then passes up between meter housing 210 and exterior wall 212 of the building to which the meter is attached. In turn, cooler ambient air from outside the chimney is drawn into the chimney through bottom opening 232. The entering air is heated as it passes up through the chimney both by heat rejected from the battery to air passing over battery housing 214 and by heating in upper segment 230b. The heating of the air in the chimney sustains the natural convective air flow through the chimney, i.e. the "chimney effect." Positioning battery housing 214 in the path of air flowing into chimney 230 through bottom opening 232 allows the coolest air to pass around battery housing 214, thus providing the maximum temperature differential to aid in heat dissipation from the battery to the air in the chimney.

Other components associated with the watt-hour meter, such as control circuits 219 for connecting the battery to the data and clock circuits, may be positioned with the battery in the chimney if such an arrangement is advantageous for cooling or other reasons.

Other arrangements of the chimney with respect to meter housing 210 that provide for sufficient air flow may be used in the alternative. Considerations with regard to provision of sufficient air flow include the cross sectional size of the chimney, the positioning of chimney upper and lower openings to allow free flow of air through them, and the provision of sufficient exposure of the outer surface of the chimney to incident sunlight to cause sufficient heating of the air in the chimney to generate the chimney effect air flow.

It will be readily understood by those skilled in the art that the present invention is not limited to the specific embodiments described and illustrated herein. Different embodiments and adaptations besides those shown herein and described, as well as many variations, modifications and equivalent arrangements, will now be apparent or will be reasonably suggested by the foregoing specification and drawings, without departing from the substance or scope of the invention. While the present invention has been described in detail in relation to its preferred embodiments, it is to be understood that this disclosure is only illustrative and exemplary of the present invention and is made merely for purpose of providing a full and enabling disclosure of the invention. Accordingly, it is intended that the invention be limited only by the spirit and scope of the appended claims.

What is claimed is:

1. An electrical-energy-supplying device having an extended storage life and subject to heating by sunlight, comprising:
   battery means for supplying electrical energy;
   chimney means for producing natural convective air flow therethrough in dependence on the intensity of sunlight incident on said chimney means; and
   means for transferring heat from said battery means to said air flow.

2. The device of claim 1 wherein said battery means is disposed in spaced relationship to said chimney means such that air flow produced by said chimney passes over said battery means to remove heat therefrom.

3. An electrical-energy-supplying device having an extended storage life and subject to heating by sunlight, comprising:
   battery means for supplying electrical energy; and
   chimney means for producing natural convective air flow therethrough in dependence on the intensity of sunlight incident on said chimney means;
   said battery means being disposed in spaced relationship to said chimney means such that air flow produced by said chimney passes over said battery to remove heat therefrom.

4. The device of claim 3 wherein said battery is disposed within said chimney.

5. The device of claim 4 wherein said battery further comprises a battery housing having fins extending outwardly from the exterior thereof to increase the surface area exposed to said airflow for heat transfer.

6. The device of claim 4 wherein said chimney means comprises a chimney body having a lower segment and an upper segment, said lower segment having a light-reflective outer surface and said upper segment having a light-absorptive outer surface, and wherein said battery means is disposed within the interior of said chimney body formed by said lower segment.

7. The device of claim 6 wherein said lower segment comprises a material having a low thermal conductivity and said upper segment comprises a material having a high thermal conductivity.

8. The device of claim 7 wherein said upper segment further comprises at least one heat exchange fin extending from said chimney body into said air flow drawn therethrough so as to increase heat transfer from said upper segment to the air.

9. The device of claim 6 wherein said chimney means further comprises at least one light baffle plate positioned within said lower segment to restrict light from entering the interior of said chimney body.

10. A time-of-use watt-hour meter for measuring electrical energy usage from a utility line, comprising:

metering means for measuring electrical energy usage;

clock and data equipment, coupled to said metering means, for recording electrical energy usage and time of use information;

a battery to supply electrical energy to said data means to maintain accurate time information if the utility line energy is interrupted; and chimney means for producing air flow therethrough in dependence on the intensity of sunlight incident on said chimney means;

said battery being disposed in spaced relation to said chimney means such that air flow produced by said chimney passes over said battery to remove heat therefrom.

11. The device of claim 10 wherein said battery is disposed within said chimney means.

12. The device of claim 11 wherein said battery further comprises a battery housing having fins extending outwardly from the exterior thereof to increase the surface area exposed to said air flow for heat transfer.

13. The device of claim 10 wherein said chimney means comprises a chimney body having a lower segment and an upper segment, said lower segment having a light reflective outer surface and said upper segment having a light absorptive outer surface, said battery being disposed within the interior of said chimney body formed by said lower segment.

14. The device of claim 13 wherein said lower segment comprises a material having a low thermal conductivity and said upper segment comprises a material having a high thermal conductivity.

15. The device of claim 14 wherein said upper segment further comprises at least one heat exchange fin extending from said chimney body into said air flow to increase heat transfer from said upper segment to the air.

16. The device of claim 15 wherein said chimney means further comprises at least one light baffle plate positioned within said lower segment to restrict light from entering the interior of said chimney body.

* * * * *